United States Patent
Kitagawa et al.

(10) Patent No.: US 10,156,671 B2
(45) Date of Patent: Dec. 18, 2018

(54) POLARIZING PLATE WITH PHASE-DIFFERENCE LAYER AND IMAGE DISPLAY DEVICE

(71) Applicant: NITTO DENKO CORPORATION, Ibaraki-shi, Osaka (JP)

(72) Inventors: Takeharu Kitagawa, Ibaraki (JP); Takashi Shimizu, Ibaraki (JP); Shusaku Goto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/551,113

(22) PCT Filed: Feb. 15, 2016

(86) PCT No.: PCT/JP2016/054219
§ 371 (c)(1),
(2) Date: Aug. 15, 2017

(87) PCT Pub. No.: WO2016/136509
PCT Pub. Date: Sep. 1, 2016

(65) Prior Publication Data
US 2018/0045872 A1 Feb. 15, 2018

(30) Foreign Application Priority Data
Feb. 26, 2015 (JP) .................. 2015-036651

(51) Int. Cl.
*G02B 5/30* (2006.01)
*G02B 1/08* (2006.01)
*G02B 1/14* (2015.01)

(52) U.S. Cl.
CPC ............. *G02B 5/3083* (2013.01); *G02B 1/08* (2013.01); *G02B 1/14* (2015.01); *G02B 5/3033* (2013.01)

(58) Field of Classification Search
CPC .......... G02B 1/08; G02B 1/14; G02B 5/3033; G02B 5/3083
(Continued)

(56) References Cited

U.S. PATENT DOCUMENTS 6,565,974 B1 5/2003 Uchiyama et al.
RE39,753 E 7/2007 Uchiyama et al.
(Continued)

FOREIGN PATENT DOCUMENTS

JP 6-337311 A 12/1994
JP 3325560 B2 9/2002
(Continued)

OTHER PUBLICATIONS

International Search Report dated May 10, 2016, issued in counterpart application No. PCT/JP2016/054219, w/English translation. (5 pages).
(Continued)

*Primary Examiner* — Ricky D Shafer
(74) *Attorney, Agent, or Firm* — Westerman, Hattori, Daniels & Adrian, LLP

(57) ABSTRACT

There is provided a polarizing plate with a retardation layer being extremely thin and having excellent durability. A polarizing plate with a retardation layer includes a polarizer; a protective layer bonded onto one side of the polarizer through intermediation of a first adhesive layer; and a retardation layer bonded onto another side of the polarizer through intermediation of a second adhesive layer. The polarizer has a thickness of from 2 μm to 12 μm, a boric acid content of 18 wt % or more, an iodine content of 2.1 wt % or more, a single layer transmittance of 44.2% or more, a polarization degree of 98% or more, and an orientation function of 0.35 or more. The retardation layer has a thickness of 50 μm or less and a birefringence Δnxy of
(Continued)

0.0025 or more. The first and second adhesive layer each has a thickness of 2 µm or less.

7 Claims, 4 Drawing Sheets

(58) Field of Classification Search
USPC .......................................... 359/487.02, 489.07
See application file for complete search history.

(56) References Cited

U.S. PATENT DOCUMENTS

| | | | |
|---|---|---|---|
| 7,548,289 B2 | 6/2009 | Sakai et al. | |
| 7,929,086 B2* | 4/2011 | Toyama | C08G 18/61 349/117 |
| 8,427,625 B2* | 4/2013 | Koshio | G02F 1/1303 349/187 |
| 9,740,044 B2* | 8/2017 | Kawamura | G02F 1/133528 |
| 2003/0103186 A1* | 6/2003 | Sasaki | G02B 5/3041 349/194 |
| 2006/0158593 A1 | 7/2006 | Sakai et al. | |
| 2007/0002231 A1* | 1/2007 | Lee | G02F 1/133528 349/117 |
| 2008/0018831 A1* | 1/2008 | Yano | G02B 5/3083 349/96 |
| 2010/0188605 A1* | 7/2010 | Hasegawa | G02B 5/3033 349/62 |
| 2011/0229730 A1* | 9/2011 | Yosomiya | B32B 27/08 428/500 |
| 2013/0160938 A1* | 6/2013 | Yasui | G02B 5/3025 156/246 |
| 2015/0043070 A1* | 2/2015 | Kitagawa | B29C 55/06 359/487.02 |
| 2015/0301385 A1 | 10/2015 | Tsunekawa | |
| 2016/0161652 A1 | 6/2016 | Kitagawa et al. | |
| 2017/0299920 A1* | 10/2017 | Mita | C08K 5/0025 |

FOREIGN PATENT DOCUMENTS

| | | |
|---|---|---|
| JP | 2006-201401 A | 8/2006 |
| JP | 2012-230181 A | 11/2012 |
| JP | 2014-35393 A | 2/2014 |
| JP | 2015-36729 A | 2/2015 |
| WO | 2014/069378 A1 | 5/2014 |
| WO | 2014/203995 A1 | 12/2014 |

OTHER PUBLICATIONS

Notification of Reasons for Refusal dated Jun. 29, 2016, issued in counterpart Japanese Patent Application No. 2015-036651, w/English translation (16 pages).

* cited by examiner

POLARIZING PLATE WITH PHASE-DIFFERENCE LAYER AND IMAGE DISPLAY DEVICE

TECHNICAL FIELD

The present invention relates to a polarizing plate with a retardation layer and an image display apparatus using the same.

BACKGROUND ART

In recent years, image display apparatus typified by a liquid crystal display apparatus and an organic EL display apparatus have been rapidly gaining more widespread use. In the image display apparatus, a polarizing plate and a retardation plate are typically used. In practical use, a polarizing plate with a retardation layer, in which the polarizing plate and the retardation plate are integrated, is widely used (for example, Patent Literature 1). In this connection, recently, along with an increasing demand for thinning of the image display apparatus, there has also been an increasing demand for thinning of the polarizing plate with a retardation layer. However, when an attempt is made for the thinning of the polarizing plate with a retardation layer, there arises a problem in that its durability (typically durability under high temperature and high humidity) becomes insufficient. The problem becomes more remarkable as the polarizing plate with a retardation layer becomes thinner.

CITATION LIST

Patent Literature

[PTL 1] JP 3325560 B2

SUMMARY OF INVENTION

Technical Problem

The present invention has been made in order to solve the problem of the related art described above, and a primary object of the present invention is to provide a polarizing plate with a retardation layer being extremely thin and having excellent durability.

Solution to Problem

According to one aspect of the present invention, a polarizing plate with a retardation layer is provided. The polarizing plate with a retardation layer includes a polarizer; a protective layer bonded onto one side of the polarizer through intermediation of a first adhesive layer; and a retardation layer bonded onto another side of the polarizer through intermediation of a second adhesive layer, wherein the polarizer has a thickness of from 2 μm to 12 μm, a boric acid content of 18 wt % or more, an iodine content of 2.1 wt % or more, a single layer transmittance of 44.2% or more, a polarization degree of 98% or more, and an orientation function of 0.35 or more, wherein the retardation layer has a thickness of 50 μm or less and a birefringence $\Delta n_{xy}$ of 0.0025 or more, and wherein the first adhesive layer and the second adhesive layer each have a thickness of 2 μm or less.

In one embodiment of the invention, the retardation layer includes a resin film selected from a cyclic olefin-based resin film and a polycarbonate-based resin film.

In one embodiment of the invention, the retardation layer is configured to function as a λ/4 plate.

In one embodiment of the invention, the polarizer is obtained by forming a polyvinyl alcohol-based resin layer on one side of a resin substrate, and stretching and dyeing a laminate of the resin substrate and the polyvinyl alcohol-based resin layer to turn the polyvinyl alcohol-based resin layer into a polarizer.

In one embodiment of the invention, the polarizing plate with a retardation layer has a total thickness of 150 μm or less.

In one embodiment of the invention, the first adhesive layer and the second adhesive layer each have an indentation elastic modulus of $1.0 \times 10^7$ Pa or more.

According to another aspect of the present invention, an image display apparatus is provided. The image display apparatus includes the polarizing plate with a retardation layer

Advantageous Effects of Invention

According to the present invention, in the thin polarizing plate with a retardation layer, the durability (in particular, streaky unevenness at the time of heating and humidification) can be remarkably improved by optimizing the thicknesses and predetermined characteristics of the polarizer and the retardation layer, and optimizing the thicknesses of the adhesive layers for laminating the respective layers.

DESCRIPTION OF EMBODIMENTS

Now, embodiments of the present invention are described. However, the present invention is not limited to these embodiments.

Definitions of Terms and Symbols

The definitions of terms and symbols used herein are as follows.
(1) Refractive Indices (nx, ny, and nz)
A symbol "nx" represents a refractive index in a direction in which an in-plane refractive index is maximum (that is, slow axis direction), "ny" represents a refractive index in a direction perpendicular to the slow axis in the plane (that is, fast axis direction), and "nz" represents a refractive index in a thickness direction.

(2) In-Plane Retardation (Re)

The term "Re(λ)" refers to the in-plane retardation of a film measured at 23° C. with light having a wavelength of λ nm. For example, the term "Re(550)" refers to the in-plane retardation of the film measured at 23° C. with light having a wavelength of 550 nm. The Re(λ) is determined from the equation "Re(λ)=(nx−ny)×d" when the thickness of the film is represented by d (nm).

(3) Thickness Direction Retardation (Rth)

The term "Rth(λ)" refers to the thickness direction retardation of the film measured at 23° C. with light having a wavelength of λ nm. For example, the term "Rth(550)" refers to the thickness direction retardation of the film measured at 23° C. with light having a wavelength of 550 nm. The Rth(λ) is determined from the equation "Rth(λ)=(nx−nz)×d" when the thickness of the film is represented by d (nm).

(4) Nz Coefficient

An Nz coefficient is determined from the equation "Nz=Rth/Re".

(5) Birefringence ($\Delta n_{xy}$)

A birefringence $\Delta n_{xy}$ is determined from the equation "$\Delta n_{xy}$=nx−ny".

A. Overall Configuration of Polarizing Plate with a Retardation Layer

Figure 1:
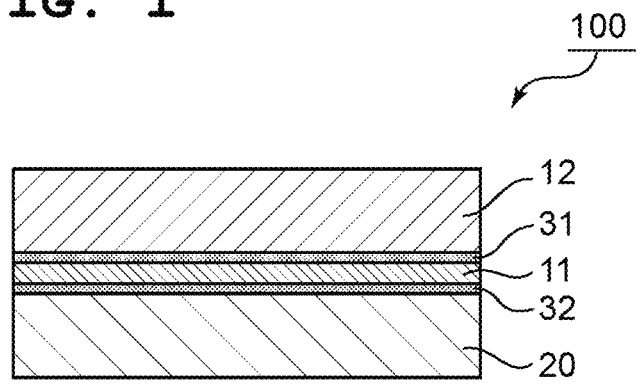
FIG. 1 is a schematic sectional view of a polarizing plate with a retardation layer according to one embodiment of the present invention.
Figure 2:
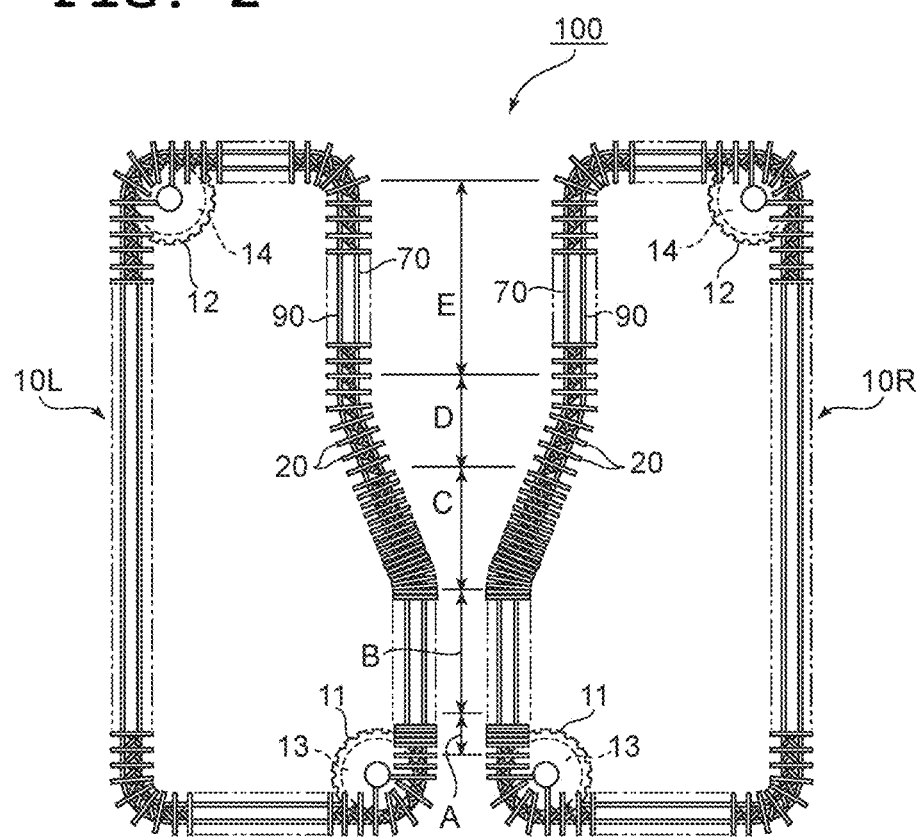
FIG. 2 is a schematic plan view for illustrating the overall configuration of an oblique stretching apparatus used in Reference Example 3.
Figure 3:
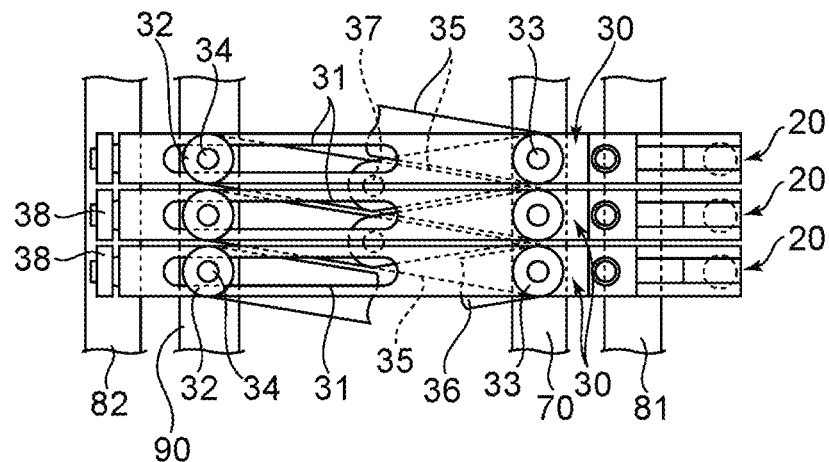
FIG. 3 is a main portion schematic plan view for illustrating a link mechanism configured to change a clip pitch in the oblique stretching apparatus of FIG. 2, the view being an illustration of a state in which the clip pitch is minimum.
Figure 4:
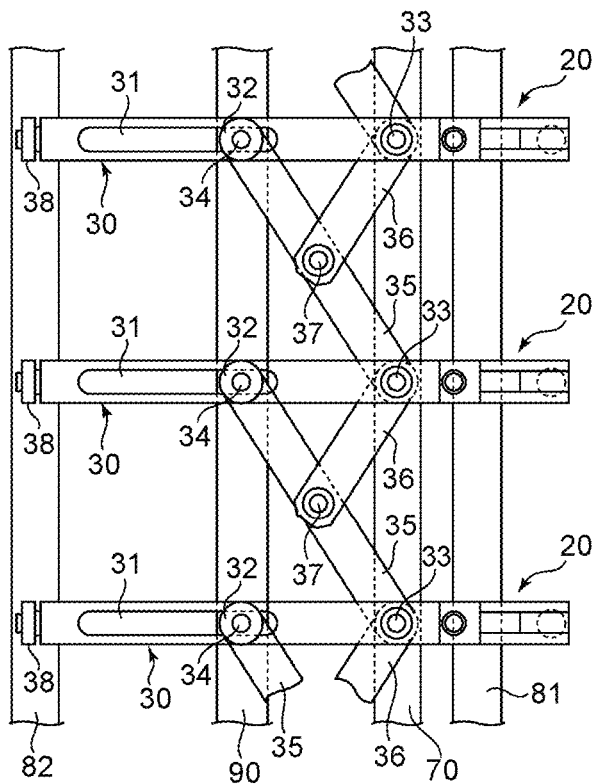
FIG. 4 is a main portion schematic plan view for illustrating the link mechanism configured to change a clip pitch in the oblique stretching apparatus of FIG. 2, the view being an illustration of a state in which the clip pitch is maximum.
Figure 5:
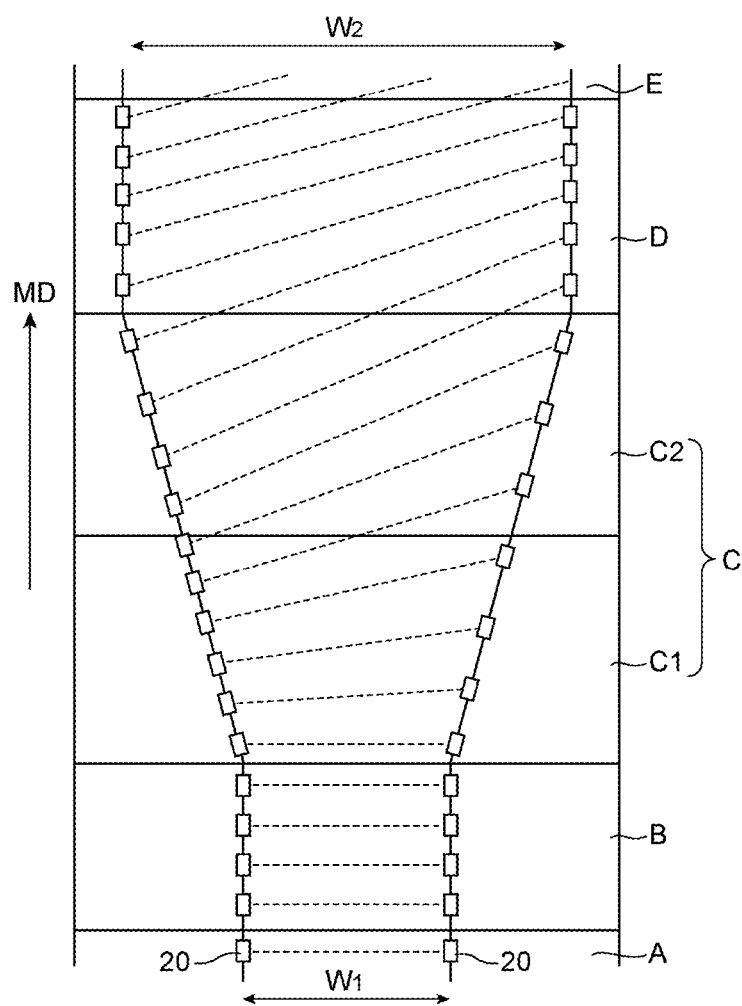
FIG. 5 is a schematic view for illustrating an embodiment of oblique stretching adopted in Reference Example 3.

FIG. 1 is a schematic sectional view of a polarizing plate with a retardation layer according to one embodiment of the present invention. A polarizing plate 100 with a retardation layer according to this embodiment includes a polarizer 11, a protective layer 12 arranged on one side of the polarizer 11, and a retardation layer 20 arranged on the other side of the polarizer 11. The polarizer 11 and the protective layer 12 are bonded through the intermediation of a first adhesive layer 31. The polarizer 11 and the retardation layer 20 are bonded through the intermediation of a second adhesive layer 32. As required, another protective layer (inner protective layer, not shown) may be arranged on the opposite side of the polarizer 11 to the protective layer 12 (between the polarizer 11 and the retardation layer 20). In the illustrated example, the inner protective layer is absent, and the retardation layer 20 doubles as a protective layer. In the embodiment of the present invention, the polarizer 11 has a thickness of from 2 μm to 12 μm, a boric acid content of 18 wt % or more, an iodine content of 2.1 wt % or more, a single layer transmittance of 44.2% or more, a polarization degree of 98% or more, and an orientation function of 0.35 or more. The retardation layer 20 has a thickness of 50 μm or less and a birefringence $\Delta n_{xy}$ of 0.028 or more. The first adhesive layer 31 and the second adhesive layer 32 each have a thickness of 2 μm or less.

The polarizing plate with a retardation layer has a total thickness of preferably 150 μm or less, more preferably 120 μm or less, still more preferably 110 μm or less, particularly preferably 100 μm or less, especially preferably 80 μm or less. A practical lower limit of the total thickness is, for example, 50 μm. The achievement of both such extremely small total thickness and excellent durability is one of the accomplishments of the present invention. Herein, the total thickness of the polarizing plate with a retardation layer refers to the total thickness of the protective layer, the first adhesive layer, the polarizer, the other protective layer if present, the second adhesive layer, and the retardation layer.

Now, the constituent layers of the polarizing plate with a retardation layer and an optical film are described in more detail.

B. Polarizer

Any appropriate polarizer may be adopted as the polarizer 11. For example, a resin film for forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichromatic substance, such as iodine or a dichromatic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The polarizer obtained by using the laminate is specifically, for example, a polarizer obtained by using a laminate of a resin substrate and a PVA-based resin layer formed on the resin substrate through application. Such polarizer may be produced by, for example, a method involving: applying a PVA-based resin solution onto the resin substrate; drying the solution to form the PVA-based resin layer on the resin substrate, thereby providing the laminate of the resin substrate and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the aerial stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeling surface. Details of such method of producing a polarizer are disclosed in, for example, JP 2012-73580 A. The entire disclosure of the laid-open publication is incorporated herein by reference.

The thickness of the polarizer is from 2 μm to 12 μm or less as described above, preferably from 3 μm to 12 μm, more preferably from 5 μm to 12 μm. According to the embodiment of the present invention, excellent optical characteristics and durability can be achieved despite the extremely small thickness of the polarizer by optimizing the predetermined configuration and characteristics of the polarizer constituting the polarizing plate with a retardation layer, and the thickness and predetermined characteristics of the retardation layer. In addition, curling at the time of heating of the polarizing plate with a retardation layer can be satisfactorily suppressed.

The boric acid content of the polarizer is 18 wt % or more as described above, preferably from 18 wt % to 25 wt %. When the boric acid content of the polarizer in the thin polarizing plate with a retardation layer is optimized to such range, the durability (in particular, streaky unevenness at the time of heating and humidification) can be improved by virtue of a synergetic effect with the optimization of the iodine content to be described later. The boric acid content may be calculated, for example, as the amount of boric acid contained per unit weight of the polarizer through the use of the following expression on the basis of a neutralization method.

{Dropwise addition amount of NaOH aqueous solution (mL)×Concentration of NaOH aqueous solution (mol/L)×$10^{-3}$/Weight of polarizer (g)}× Molecular weight of boric acid (g/mol)×100

The iodine content of the polarizer is 2.1 wt % or more as described above, preferably from 2.1 wt % to 5.5 wt %. When the iodine content of the polarizer in the thin polarizing plate with a retardation layer is optimized to such range, the durability (in particular, streaky unevenness at the time of heating and humidification) can be improved by virtue of a synergetic effect with the optimization of the boric acid content described above. The term "iodine content" as used herein means the amount of all iodine contained in the polarizer (PVA-based resin film). More specifically, in the polarizer, iodine is present in the forms of an iodide ion ($I^-$), an iodine molecule ($I_2$), polyiodide ions ($I_3^-$ and $I_5^-$), and the like, and the term "iodine content" as used herein means the amount of iodine encompassing all of those forms. The iodine content may be calculated by, for example, a calibration curve method for X-ray fluorescence analysis. The polyiodide ions are each present in a state of forming a PVA-iodine complex in the polarizer. Through the formation of such complex, absorption dichroism can be expressed in the wavelength range of visible light. Specifically, a complex of PVA and a triiodide ion ($PVA \cdot I_3^-$) has an absorption peak around 470 nm, and a complex of PVA and a pentaiodide ion ($PVA \cdot I_5^-$) has an absorption peak around 600 nm. As a result, the polyiodide ions can absorb light in a wide range of visible light depending on their forms. Meanwhile, the iodide ion ($I^-$) has an absorption peak around 230 nm, and is not substantially involved in the absorption of visible light. Therefore, the polyiodide ions each present in a state of a complex with PVA can be mainly involved in the absorption performance of the polarizer.

The setting of the boric acid content and the iodine content in the polarizer to the ranges as described above is one of the features in the present invention. That is, the boric acid content and iodine content as described above can deal with a new problem occurring when the thickness of the polarizer is set to be extremely small as described above, and can contribute to improving the durability (in particular, streaky unevenness at the time of heating and humidification) of the polarizing plate to be obtained. More details are as described below. Hitherto, the extremely thin polarizer as described above has been difficult to industrially manufacture in the first place. In recent years, however, it has been becoming possible to industrially manufacture such extremely thin polarizer. When such extremely thin polarizer first became possible to manufacture, its optical characteristics and durability were both insufficient. As a result of trial and error for solving such problem, it has been found that when the boric acid content and iodine content of the polarizer are made higher than those in the case of a related-art thick polarizer, there is obtained a polarizer that is extremely thin, and excellent in optical characteristics and durability (e.g., performance of maintaining the optical characteristics). It has also been found that when the boric acid content and iodine content of the polarizer are set to the ranges as described above in the thin polarizing plate with a retardation layer in which the layer thickness and predetermined characteristics of each layer have been optimized, not only the durability of the polarizer, but also the durability (in particular, external appearance durability like streaky unevenness at the time of heating and humidification) of the polarizing plate with a retardation layer as a whole can be improved. This effect is a finding obtained for the first time by applying the boric acid content and iodine content as described above to the polarizer of the polarizing plate with a retardation layer having such specific configuration, and is an unexpected excellent effect.

The polarizer preferably shows absorption dichroism at any wavelength in the wavelength range of from 380 nm to 780 nm. As described above, the single layer transmittance of the polarizer is from 44.0% to 45.5%, preferably from 44.5% to 45.0%. According to the present invention, a polarizing plate with a retardation layer being extremely thin and having excellent durability can be achieved, and moreover, the excellent single layer transmittance as described above can be achieved in such polarizing plate with a retardation layer.

The polarization degree of the polarizer is 98% or more as described above, preferably 98.5% or more, more preferably 99% or more. According to the present invention, a polarizing plate with a retardation layer being extremely thin and having excellent durability can be achieved, and moreover, in such polarizing plate with a retardation layer, the excellent polarization degree as described above can be achieved.

The orientation function of the polarizer is 0.35 or more as described above, preferably from 0.35 to 0.60, more preferably from 0.35 to 0.50. When the orientation function is optimized to such range, a polarizing plate with a retardation layer being extremely thin and having excellent durability can be achieved, and moreover, the excellent single layer transmittance and polarization degree as described above can both be achieved in such polarizing plate with a retardation layer. The orientation function (f) is determined by, for example, attenuated total reflection (ATR) spectroscopy with a Fourier transform infrared spectrophotometer (FT-IR) using polarized light as measurement light. Specifically, measurement is performed under a state in which the measurement light is set to each of 0° and 90° with respect to a stretching direction, and the orientation function (f) is calculated in accordance with the following equation using the intensity of the resultant spectrum at 2,941 $cm^{-1}$. Here, the intensity I is a value for 2,941 $cm^{-1}$/3,330 $cm^{-1}$ with respect to a reference peak at 3,330 $cm^{-1}$. The condition of f=1 indicates a perfect orientation, whereas the condition of f=0 indicates a random orientation. In addition, a peak at 2,941 $cm^{-1}$ is considered to represent absorption resulting from the vibration of the main chain (—$CH_2$—) of PVA.

$$f = (3 < \cos^2 \theta > -1)/2$$
$$= [(R-1)(R_0+2)]/[(R+2)(R_0-1)]$$
$$= (1-D)/[c(2D+1)]$$
$$= -2 \times (1-D)/(2D+1)$$

where
$c=(3 \cos^2 \beta - 1)/2$
$\beta=90$ deg
$\theta$: angle of a molecular chain with respect to the stretching direction
$\beta$: transition dipole moment with respect to the axis of the molecular chain
$R_0 = 2 \cot^2 \beta$
$1/R=D=(I//)/(I\perp)$ (higher orientation of PVA molecules means larger D)
$I\perp$: absorption intensity in measurement performed by allowing the measurement light (polarized light) to enter in a direction perpendicular to the stretching direction
$I//$: absorption intensity in measurement performed by allowing the measurement light (polarized light) to enter in a direction parallel to the stretching direction C. Protective Layer The protective layer 12 is formed of any appropriate film that may be used as a protective layer for a polarizer. A material serving as a main component of the film is specifically, for example: a cellulose-based resin, such as triacetylcellulose (TAC); a transparent resin, such as a polyester-based, polyvinyl alcohol-based, polycarbonate-based, polyamide-based, polyimide-based, polyether sulfone-based, polysulfone-based, polystyrene-based, polynorbornene-based, polyolefin-based, (meth)acrylic, or acetate-based transparent resin; or a thermosetting resin or a UV-curable resin, such as a (meth)acrylic, urethane-based, (meth)acrylic urethane-based, epoxy-based, or silicone-based thermosetting resin or UV-curable resin. A further example thereof is a glassy polymer, such as a siloxane-based polymer. In addition, a polymer film disclosed in JP 2001-343529A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as the material for the film, and the composition is, for example, a resin composition having an alternating copolymer formed of isobutene and N-methylmaleimide, and an acrylonitrile-styrene copolymer. The polymer film may be, for example, an extrudate of the resin composition.

As described later, the polarizing plate with a retardation layer of the present invention is typically arranged on the viewer side of an image display apparatus, and the protective layer 12 is typically arranged on its viewer side. Therefore, the protective layer 12 may be subjected to surface treatment, such as hard coat treatment, antireflection treatment, anti-sticking treatment, or antiglare treatment, as required.

Any appropriate thickness may be adopted as the thickness of the protective layer as long as the effect of the present invention can be obtained. The thickness of the protective layer is, for example, from 20 μm to 40 μm, preferably from 25 μm to 35 μm. When the surface treatment is performed, the thickness of the protective layer is a thickness including the thickness of a surface treatment layer.

D. Another Protective Layer

Another protective layer (inner protective layer) to be arranged as required is also formed of any appropriate film that may be used as a protective layer for a polarizer. A material serving as a main component of the film is as described in the section B regarding the protective layer 12. It is preferred that the inner protective layer be optically isotropic. The phrase "be optically isotropic" as used herein refers to having an in-plane retardation Re(550) of from 0 nm to 10 nm and a thickness direction retardation Rth(550) of from −10 nm to +10 nm.

The thickness of the inner protective layer is, for example, from 15 μm to 35 μm, preferably from 20 μm to 30 μm.

E. Retardation Layer

The retardation layer 20 may be formed of a retardation film having any appropriate optical characteristics and/or mechanical characteristics depending on purposes. The retardation layer 20 typically has a slow axis. In one embodiment, an angle θ formed by the slow axis of the retardation layer 20 and the absorption axis of the polarizer 11 is preferably from 38° to 52°, more preferably from 42° to 48°, still more preferably about 45°. When the angle θ falls within such range, through the use of the retardation layer as a λ/4 plate as described later, a polarizing plate with a retardation layer having an extremely excellent circular polarization characteristic (consequently an extremely excellent antireflection characteristic) can be obtained.

The retardation layer preferably has a refractive index characteristic of showing a relationship of nx>ny≥nz. The retardation layer is typically arranged in order to impart an antireflection characteristic to the polarizing plate, and in one embodiment, may function as a λ/4 plate. In this case, the in-plane retardation Re(550) of the retardation layer is preferably from 80 nm to 200 nm, more preferably from 100 nm to 180 nm, still more preferably from 110 nm to 170 nm. Herein, "ny=nz" encompasses not only the case where ny and nz are exactly equal to each other, but also the case where ny and nz are substantially equal to each other. Therefore, a relationship of ny<nz may be satisfied without impairing the effect of the present invention.

The birefringence $\Delta n_{xy}$ of the retardation layer is 0.0025 or more as described above, preferably 0.0028 or more. Meanwhile, the upper limit of the birefringence $\Delta n_{xy}$ is, for example, 0.0060, preferably 0.0050. When the birefringence is optimized to such range, a retardation layer being thin and having desired optical characteristics can be obtained.

The Nz coefficient of the retardation layer is preferably from 0.9 to 3, more preferably from 0.9 to 2.5, still more preferably from 0.9 to 1.5, particularly preferably from 0.9 to 1.3. When such relationship is satisfied, in the case of using the polarizing plate with a retardation layer to be obtained for an image display apparatus, an extremely excellent reflection hue can be achieved.

The retardation layer may show a reverse wavelength dispersion characteristic, i.e., a retardation value increasing with an increase in wavelength of measurement light, may show a positive wavelength dispersion characteristic, i.e., a retardation value decreasing with an increase in wavelength of measurement light, or may show a flat wavelength dispersion characteristic, i.e., a retardation value hardly changing even when the wavelength of measurement light changes. In one embodiment, the retardation layer shows a reverse wavelength dispersion characteristic. In this case, the retardation layer has an Re(450)/Re(550) of preferably 0.8 or more and less than 1, more preferably 0.8 or more and 0.95 or less. With such configuration, an extremely excellent antireflection characteristic can be achieved. In another embodiment, the retardation layer shows a flat wavelength dispersion characteristic. In this case, the retardation layer has an Re(450)/Re(550) of preferably from 0.99 to 1.03 and an Re(650)/Re(550) of preferably from 0.98 to 1.02. In this case, the retardation layer may have a laminated structure. Specifically, through the arrangement of a retardation film functioning as a λ/2 plate and a retardation film functioning as a λ/4 plate at a predetermined axis angle (e.g., from 50° to 70°, preferably about 60°), a characteristic close to an ideal reverse wavelength dispersion characteristic can be obtained, and as a result, an extremely excellent antireflection characteristic can be achieved.

The retardation layer has a water absorption ratio of 3% or less, preferably 2.5% or less, more preferably 2% or less. When such water absorption ratio is satisfied, changes in display characteristics over time can be suppressed. The water absorption ratio may be determined in conformity to JIS K 7209.

The retardation layer contains a resin having an absolute value of its photoelastic coefficient of preferably $2\times10^{-11}$ $m^2/N$ or less, more preferably from $2.0\times10^{-13}$ $m^2/N$ to $1.5\times10^{-11}$ $m^2/N$, still more preferably from $1.0\times10^{-12}$ $m^2/N$ to $1.2\times10^{-11}$ $m^2/N$. When the absolute value of the photoelastic coefficient falls within such range, a retardation change is less liable to be generated in the case where a shrinkage stress is generated at the time of heating. As a result, heat unevenness in an image display apparatus to be obtained can be satisfactorily prevented.

The thickness of the retardation layer is 50 μm or less as described above, preferably from 20 μm to 50 μm. The retardation layer to be used in the embodiment of the present invention can achieve desired optical characteristics while having such small thickness, and hence can contribute to thinning of the polarizing plate with a retardation layer. In addition, curling at the time of bonding of the polarizer (substantially the polarizing plate) and the retardation layer can be satisfactorily adjusted. Further, with such thickness, an appropriate mechanical strength as a protective layer for a polarizer can be imparted.

The retardation layer 20 may include any appropriate resin film that can satisfy the characteristics as described above. Typical examples of such resin include a cyclic olefin-based resin, a polycarbonate-based resin, a cellulose-based resin, a polyester-based resin, a polyvinyl alcohol-based resin, a polyamide-based resin, a polyimide-based resin, a polyether-based resin, a polystyrene-based resin, and an acrylic resin. Of those, a cyclic olefin-based resin or a polycarbonate-based resin may be suitably used.

The cyclic olefin-based resin is a generic name for resins each polymerized by using a cyclic olefin as a polymerization unit, and examples thereof include resins disclosed in JP 01-240517 A, JP 03-14882 A, JP 03-122137 A, and the like. Specific examples thereof include a ring-opened (co)polymer of a cyclic olefin, a polymer obtained by the addition polymerization of a cyclic olefin, a copolymer (typically a random copolymer) of a cyclic olefin and an α-olefin, such as ethylene or propylene, a graft-modified polymer obtained by modifying the polymer with an unsaturated carboxylic acid or a derivative thereof, and a hydrogenated product thereof. A specific example of the cyclic olefin is a norborene-based monomer. Examples of the norbornene-based monomer include: norbornene, alkyl- and/or alkylidene- substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group- (such as halogen-) substituted products thereof; dicyclopentadiene and 2,3-dihydrodicyclopentadiene; dimethanooctahydronaphthalene, alkyl- and/or alkylidene-substituted products thereof, and polar group- (such as halogen-) substituted products thereof, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8, 8a-octahydronaphthalene, 6-cyano-1,4:5,8-dimethano-1,4, 4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; a trimer and a tetramer of cyclopentadiene, such as 4,9:5,8-dimethano-3a,4,4a,5,8,8a,9,9a-octahydro-1H-benzoindene and 4,11:5,10:6,9-trimethano-3a,4, 4a,5,5a,6,9,9a,10,10a,11,11a-dodecahydro-1H-cyclopentaanthracene.

In the present invention, any other cycloolefin that may be subjected to ring-opening polymerization may be used in combination with the cycloolefin to the extent that the object of the present invention is not impaired. Specific examples of such cycloolefin include compounds each having one reactive double bond, such as cyclopentene, cyclooctene, and 5,6-dihydrodicyclopentadiene.

The number-average molecular weight (Mn) of the cyclic olefin-based resin, which is measured by a gel permeation chromatograph (GPC) method with a toluene solvent, is preferably from 25,000 to 200,000, more preferably from 30,000 to 100,000, most preferably from 40,000 to 80,000. When the number-average molecular weight falls within the range, a resin film being excellent in mechanical strength and having satisfactory solubility, formability, and flow-casting operability can be obtained.

When the cyclic olefin-based resin is obtained by hydrogenating a ring-opened polymer of a norbornene-based monomer, a hydrogenation rate is preferably 90% or more, more preferably 95% or more, most preferably 99% or more. When the hydrogenation rate falls within such range, the resin is excellent in, for example, heat deterioration resistance and light deterioration resistance.

A commercially available film may be used as the cyclic olefin-based resin film. Specific examples thereof include products available under the product names "ZEONEX" and "ZEONOR" manufactured by Zeon Corporation, a product available under the product name "Arton" manufactured by JSR Corporation, a product available under the product name "TOPAS" manufactured by TICONA, and a product available under the product name "APEL" manufactured by Mitsui Chemicals, Inc.

The polycarbonate resin preferably contains a structural unit derived from a dihydroxy compound represented by the following general formula (1), a structural unit derived from a dihydroxy compound represented by the following general formula (2), and structural units derived from one or more kinds of dihydroxy compounds selected from the group consisting of a dihydroxy compound represented by the following general formula (3), a dihydroxy compound represented by the following general formula (4), a dihydroxy compound represented by the following general formula (5), and a dihydroxy compound represented by the following general formula (6).

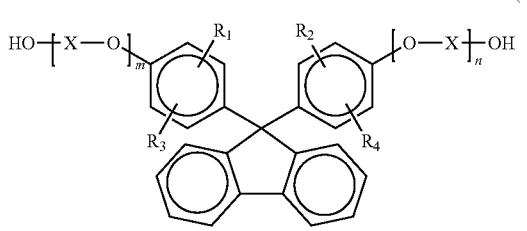

(1)

In the general formula (1), $R_1$ to $R_4$ each independently represent a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms, X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and m and n each independently represent an integer of from 0 to 5.

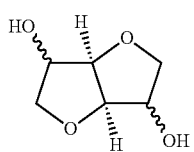

(2)

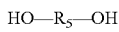

(3)

In the general formula (3), $R_5$ represents a substituted or unsubstituted cycloalkylene group of a monocyclic structure having 4 to 20 carbon atoms.

(4)

In the general formula (4), $R_6$ represents a substituted or unsubstituted cycloalkylene group of a monocyclic structure having 4 to 20 carbon atoms.

(5)

In the general formula (5), $R_7$ represents a substituted or unsubstituted alkylene group having 2 to 10 carbon atoms, and p represents an integer of from 2 to 100.

(6)

In the general formula (6), $R_{11}$ represents an alkyl group having 2 to 20 carbon atoms or a group represented by the following formula (7)

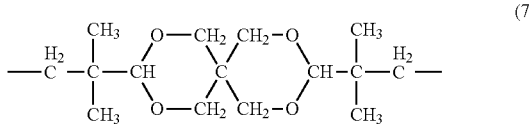

(7)

<Dihydroxy Compound Represented by the General Formula (1)>

Specific examples of the dihydroxy compound represented by the general formula (1) include 9,9-bis(4-hydroxyphenyl) fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl) fluorene, 9,9-bis(4-hydroxy-3-tert-propylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl) fluorene. Of those, 9,9-bis(4-hydroxy-3-methylphenyl)fluorene, 9,9-bis(4-(2-hydroxyethoxy)phenyl)fluorene, and 9,9-bis(4-(2-hydroxyethoxy)-3-methylphenyl)fluorene are preferred, and 9,9-bis (4-(2-hydroxyethoxy)phenyl)fluorene is particularly preferred.

<Dihydroxy Compound Represented by the General Formula (2)>

Examples of the dihydroxy compound represented by the general formula (2) include isosorbide, isomannide, and isoidide, which are in a stereoisomeric relationship. Those compounds may be used alone or in combination thereof. Of those dihydroxy compounds, isosorbide, which is obtained by dehydration condensation of sorbitol produced from various starches that are abundantly present as resources and easily obtainable, is most preferred in terms of being easy to obtain and produce, optical characteristics, and formability.

<Dihydroxy Compound Represented by the General Formula (3)>

An example of the dihydroxy compound represented by the general formula (3) is a compound containing a cycloalkylene group of a monocyclic structure (alicyclic dihydroxy compound). When the monocyclic structure is adopted, the toughness of a film formed of the polycarbonate resin to be obtained can be improved. A typical example of the alicyclic dihydroxy compound is a compound containing a five-membered ring structure or a six-membered ring structure. With the five-membered ring structure or the six-membered ring structure, the heat resistance of the polycarbonate resin to be obtained can be increased. The six-membered ring structure may be fixed to a chair form or a boat form by a covalent bond. Specific examples thereof include 1,2-cyclopentanediol, 1,3-cyclopentanediol, 1,2-cyclohexanediol, 1,3-cyclohexanediol, 1,4-cyclohexanediol, and 2-methyl-1,4-cyclohexanediol. The dihydroxy compounds each represented by the general formula (3) may be used alone or in combination thereof.

<Dihydroxy Compound Represented by the General Formula (4)>

An example of the dihydroxy compound represented by the general formula (4) is a compound containing a cycloalkylene group of a monocyclic structure (alicyclic dihydroxy compound). When the monocyclic structure is adopted, the toughness of a film formed of the polycarbonate resin to be obtained can be improved. Typical examples of the alicyclic dihydroxy compound include various isomers in each of which $R_6$ in the general formula (4) is represented by the following general formula (Ia), where $R^3$ represents a hydrogen atom, or a substituted or unsubstituted alkyl group having 1 to 12 carbon atoms. Preferred specific examples of such isomers include 1,2-cyclohexanedimethanol, 1,3-cyclohexanedimethanol, and 1,4-cyclohexanedimethanol. Those isomers are easy to obtain and excellent in handling property. The dihydroxy compounds each represented by the general formula (4) may be used alone or in combination thereof.

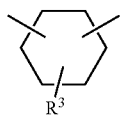

(Ia)

The compounds given above as examples of the dihydroxy compounds represented by the general formulae (3) and (4) are examples of alicyclic dihydroxy compounds that may be used, and the dihydroxy compounds are by no means limited thereto.

<Dihydroxy Compound Represented by the General Formula (5)>

Specific examples of the dihydroxy compound represented by the general formula (5) include diethylene glycol, triethylene glycol, and polyethylene glycol (molecular weight: 150 to 2,000).

<Dihydroxy Compound Represented by the General Formula (6)>

Specific examples of the dihydroxy compound represented by the general formula (6) include ethylene glycol, propylene glycol, 1,4-butanediol, 1,6-hexanediol, and a spiroglycol represented by the following formula (8). Of those, propylene glycol, 1,4-butanediol, and a spiroglycol are preferred.

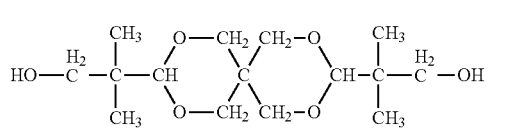

(8)

Of the structural unit derived from the dihydroxy compound represented by the general formula (3), the structural unit derived from the dihydroxy compound represented by the general formula (4), the structural unit derived from the dihydroxy compound represented by the general formula (5), and the structural unit derived from the dihydroxy compound represented by the general formula (6), the polycarbonate resin contains preferably the structural unit derived from the dihydroxy compound represented by the general formula (4) and/or the structural unit derived from the dihydroxy compound represented by the general formula (5), more preferably the structural unit derived from the dihydroxy compound represented by the general formula (5). When the polycarbonate resin contains the structural unit derived from the dihydroxy compound represented by the general formula (5), stretchability can be improved.

The polycarbonate resin of this embodiment may further contain a structural unit derived from any other dihydroxy compound.

<Other Dihydroxy Compound>

Examples of the other dihydroxy compound include bisphenols. Examples of the bisphenols include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, and 4,4'-dihydroxy-2,5-diethoxydiphenyl ether.

In the polycarbonate resin, the content of the structural unit derived from the dihydroxy compound represented by the general formula (1) is 18 mol % or more, preferably 20 mol % or more, more preferably 25 mol % or more. When the content of the structural unit in question is excessively small, reverse dispersion-type wavelength dependence may not be obtained.

In the polycarbonate resin, the content of the structural units derived from one or more kinds of dihydroxy compounds selected from the group consisting of the dihydroxy compound represented by the general formula (3), the dihydroxy compound represented by the general formula (4), the dihydroxy compound represented by the general formula (5), and the dihydroxy compound represented by the general formula (6) is preferably 25 mol % or more, more preferably 30 mol % or more, still more preferably 35 mol % or more. When the content of the structural units in question is excessively small, the toughness of a film to be formed may become poor.

The glass transition temperature of the polycarbonate resin is preferably 110° C. or more and 150° C. or less, more preferably 120° C. or more and 140° C. or less. When the glass transition temperature is excessively low, the heat resistance of the resin tends to deteriorate and hence the resin may cause a dimensional change after its forming into a film. In addition, the image quality of an organic EL panel to be obtained may deteriorate. When the glass transition temperature is excessively high, the forming stability of the resin at the time of its forming into a film may deteriorate. In addition, the transparency of the film may be impaired. The glass transition temperature is determined in conformity to JIS K 7121 (1987).

The molecular weight of the polycarbonate resin may be expressed as a reduced viscosity. The reduced viscosity is measured with an Ubbelohde viscometer at a temperature of 20.0° C.±0.1° C. after precise adjustment of a polycarbonate concentration to 0.6 g/dL through the use of methylene chloride as a solvent. The lower limit of the reduced viscosity is generally preferably 0.30 dL/g, more preferably 0.35 dL/g or more. The upper limit of the reduced viscosity is generally preferably 1.20 dL/g, more preferably 1.00 dL/g, still more preferably 0.80 dL/g. When the reduced viscosity is lower than the lower limit value, there may arise a problem of a reduction in mechanical strength of a formed article. Meanwhile, when the reduced viscosity is higher than the upper limit value, there may arise a problem in that flowability during forming is decreased to decrease productivity and formability.

A commercially available film may be used as a polycarbonate-based resin film. Specific examples of the commercially available product include products available under the product names "PURE-ACE WR-S", "PURE-ACE WR-W", and "PURE-ACE WR-M" from Teijin Limited, and a product available under the product name "NRF" from Nitto Denko Corporation.

The retardation layer 20 is obtained by, for example, stretching a film formed from the cyclic olefin-based resin or the polycarbonate-based resin. Any appropriate forming method may be adopted as a method of forming a film from the cyclic olefin-based resin or the polycarbonate-based resin. Specific examples thereof include a compression molding method, a transfer molding method, an injection molding method, an extrusion molding method, a blow molding method, a powder forming method, a FRP molding method, a cast coating method (such as a casting method), a calender molding method, and a hot-press method. Of those, an extrusion molding method or a cast coating method is preferred. This is because the extrusion molding method or the cast coating method can increase the smoothness of the film to be obtained and provide satisfactory optical uniformity. Forming conditions may be appropriately set depending on, for example, the composition and kind of the resin to be used, and the desired characteristics of the retardation layer. As described above, for the cyclic olefin-based resin or the polycarbonate-based resin, many film products are commercially available, and hence the commercially available films may each be subjected to stretching treatment as it is.

The thickness of the resin film (unstretched film) may be set to any appropriate value depending on, for example, the desired thickness and desired optical characteristics of the retardation layer, and stretching conditions to be described later. The thickness is preferably from 50 μm to 300 μm.

Any appropriate stretching method and stretching conditions (such as a stretching temperature, a stretching ratio, and a stretching direction) may be adopted for the stretching. Specifically, one kind of various stretching methods, such as free-end stretching, fixed-end stretching, free-end shrinkage, and fixed-end shrinkage, may be employed alone, or two or more kinds thereof may be employed simultaneously or sequentially. With regard to the stretching direction, the stretching may be performed in various directions or dimensions, such as a lengthwise direction, a widthwise direction, a thickness direction, and an oblique direction. When the glass transition temperature of the resin film is represented by Tg, the stretching temperature falls within a range of preferably from Tg−30° C. to Tg+60° C., more preferably from Tg−10° C. to Tg+50° C.

A retardation film having the desired optical characteristics (such as a refractive index characteristic, an in-plane retardation, and an Nz coefficient) can be obtained by appropriately selecting the stretching method and stretching conditions.

In one embodiment, the retardation film is produced by subjecting a resin film to uniaxial stretching or fixed-end uniaxial stretching. The fixed-end uniaxial stretching is specifically, for example, a method involving stretching the resin film in its widthwise direction (lateral direction) while running the film in its lengthwise direction. The stretching ratio is preferably from 1.1 times to 3.5 times.

In another embodiment, the retardation film may be produced by continuously subjecting a resin film having an elongate shape to oblique stretching in the direction of the angle θ with respect to a lengthwise direction. When the oblique stretching is adopted, a stretched film having an elongate shape and having an alignment angle that is the angle θ with respect to the lengthwise direction of the film (having a slow axis in the direction of the angle θ) is obtained, and for example, roll-to-roll manufacture can be performed in its lamination with the polarizer, with the result that the manufacturing process can be simplified. The angle θ may be an angle formed by the absorption axis of the polarizer and the slow axis of the retardation layer in the polarizing plate with a retardation layer. As described above, the angle θ is preferably from 38° to 52°, more preferably from 42° to 48°, still more preferably about 45°.

As a stretching machine to be used for the oblique stretching, for example, there is given a tenter stretching machine capable of applying feeding forces, or tensile forces or take-up forces, having different speeds on left and right sides in a lateral direction and/or a longitudinal direction. Examples of the tenter stretching machine include a lateral uniaxial stretching machine and a simultaneous biaxial stretching machine, and any appropriate stretching machine may be used as long as the resin film having an elongate shape can be continuously subjected to the oblique stretching.

Through appropriate control of each of the speeds on the left and right sides in the stretching machine, a retardation layer (substantially a retardation film having an elongate shape) having the desired in-plane retardation and having a slow axis in the desired direction can be obtained.

The stretching temperature of the film may be changed depending on, for example, the desired in-plane retardation value and thickness of the retardation layer, the kind of the resin to be used, the thickness of the film to be used, and a stretching ratio. Specifically, the stretching temperature is preferably from Tg−30° C. to Tg+30° C., more preferably from Tg−15° C. to Tg+15° C., most preferably from Tg−10° C. to Tg+10° C. When the stretching is performed at such temperature, a retardation layer having characteristics appropriate in the present invention can be obtained. Tg refers to the glass transition temperature of the material constituting the film.

F. Adhesive Layers

The first adhesive layer 31 and the second adhesive layer 32 may each be constituted of any appropriate adhesive or pressure-sensitive adhesive as long as the effect of the present invention is obtained. The first adhesive layer 31 and the second adhesive layer 32 may be constituted of the same material, or may be constituted of materials different from each other. In the embodiment of the present invention, the first adhesive layer 31 and the second adhesive layer 32 are each typically constituted of an adhesive. The adhesive may be an aqueous adhesive, or may be a solvent-based adhesive. An aqueous adhesive is preferably used. A typical example of the aqueous adhesive is a polyvinyl alcohol (PVA)-based adhesive.

The average polymerization degree of a PVA-based resin contained in the PVA-based adhesive is preferably from about 100 to about 5,500, more preferably from 1,000 to 4,500 from the viewpoint of an adhesive property. The average saponification degree of the PVA-based resin is preferably from about 85 mol % to about 100 mol %, more preferably from 90 mol % to 100 mol % from the viewpoint of the adhesive property.

The PVA-based resin contained in the aqueous adhesive preferably contains an acetoacetyl group. The acetoacetyl group-containing PVA-based resin is obtained by, for example, allowing a PVA-based resin and diketene to react with each other by any appropriate method. The acetoacetyl group modification degree of the acetoacetyl group-containing PVA-based resin is typically 0.1 mol % or more, preferably from about 0.1 mol % to about 40 mol %, more preferably from 1 mol % to 20 mol %, particularly preferably from 2 mol % to 7 mol %. The acetoacetyl group modification degree is a value measured by NMR.

The resin concentration of the aqueous adhesive is preferably from 0.1 wt % to 15 wt %, more preferably from 0.5 wt % to 10 wt %.

The thickness of each of the first adhesive layer 31 and the second adhesive layer 32 is 2 μm or less as described above, preferably from 0.5 μm to 2 μm. When the thickness of each of the adhesive layers in the thin polarizing plate with a retardation layer is optimized to such range, the durability (in particular, streaky unevenness at the time of heating and humidification) can be improved by virtue of a synergetic effect with the optimization of the boric acid content and iodine content described above. As long as the first adhesive layer 31 and the second adhesive layer 32 each have such thickness, their thicknesses may be equal to or different from each other.

The first adhesive layer 31 and the second adhesive layer 32 each have an indentation elastic modulus of preferably $1.0\times10^7$ Pa or more, more preferably $1.0\times10^8$ Pa or more. As described above, when the thickness of each of the adhesive layers is set to 2 μm or less and the indentation elastic modulus is small, the adhesive property becomes insufficient, and for example, peeling occurs in a durability test in some cases. The upper limit of the indentation elastic modulus is, for example, $1.0\times10^{11}$ Pa. The indentation elastic modulus may be measured in conformity to JIS Z 2255.

G. Others

A polarizing plate with a retardation layer according to an embodiment of the present invention may further include another retardation layer. The optical characteristics (such as refractive index characteristics, in-plane retardation, Nz coefficient, and photoelastic coefficient), thickness, arrangement position, and the like of the other retardation layer may be appropriately set depending on purposes.

A pressure-sensitive adhesive layer (not shown) may be arranged on the surface of the retardation layer 20 of the polarizing plate with a retardation layer (when another retardation layer is arranged, the surface of the outermost retardation layer). When the pressure-sensitive adhesive layer is arranged in advance, the polarizing plate with a retardation layer can be easily bonded onto another optical member or an image display apparatus. It is preferred that a release film be attached onto the surface of the pressure-sensitive adhesive layer until use.

H. Image Display Apparatus

The polarizing plate with a retardation layer described in the section A to the section G may be applied to an image display apparatus. Therefore, the present invention encompasses an image display apparatus using such polarizing plate with a retardation layer. Typical examples of the image display apparatus include a liquid crystal display apparatus and an organic EL display apparatus. An image display apparatus according to an embodiment of the present invention includes, on its viewer side, the polarizing plate with a retardation layer described in the section A to the section G. The polarizing plate with a retardation layer is laminated so that the retardation layer is arranged on a display panel (e.g., liquid crystal panel or organic EL panel) side (so that the polarizer is arranged on the viewer side).

EXAMPLES

Now, the present invention is specifically described by way of Examples. However, the present invention is not limited by these Examples. Measurement methods for characteristics are as described below.

(1) Thickness

Measurement was performed with a digital micrometer (KC-351C manufactured by Anritsu Corporation).

(2) Single Layer Transmittance and Polarization Degree of Polarizer

A single layer transmittance T, a parallel transmittance Tp, and a cross transmittance Tc measured for a laminate of "protective layer/polarizer/retardation layer" used in each of Examples and Comparative Examples with a UV-visible spectrophotometer (V-7100 manufactured by JASCO Corporation) were defined as the T, Tp, and Tc of the polarizer, respectively. The T, Tp, and Tc are Y values measured with the two-degree field of view (C light source) of JIS Z 8701 and subjected to visibility correction. Light absorption of the protective layer is negligibly small as compared to light absorption of the polarizer, and hence the transmittances of the laminate were defined as the transmittances of the polarizer.

A polarization degree P was determined by the following equation on the basis of the resultant T, Tp, and Tc.

Polarization degree $P(\%)=\{(Tp-Tc)/(Tp+Tc)\}^{1/2}\times100$ (3) Orientation Function of Polarizer For the polarizer used in each of Examples and Comparative Examples, evaluation of a polarizer surface was performed by attenuated total reflection (ATR) spectroscopy with a Fourier transform infrared spectrophotometer (FT-IR) (manufactured by Perkin Elmer, product name: "SPECTRUM 2000") using polarized light as measurement light. An orientation function was calculated by the following procedure: measurement was performed under a state in which the measurement light was set to each of 0° and 90° with respect to a stretching direction, and the orientation function was calculated in accordance with the following equation using the intensity of the resultant spectrum at 2,941 $cm^{-1}$. Details about the equation are as described above.

$$f = (3<\cos^2\theta>-1)/2$$
$$= [(R-1)(R_0+2)]/[(R+2)(R_0-1)]$$
$$= (1-D)/[c(2D+1)]$$
$$= -2\times(1-D)/(2D+1)$$

(4) Boric Acid Content of Polarizer

The polarizer used in each of Examples and Comparative Examples was dried by heating (120° C., 2 hours), and then pulverized to provide a sample for evaluation having a weight of 1 g. All the 1 g of the sample for evaluation was dissolved in 500 ml of water at 95° C. To the resultant aqueous solution, 10 g of mannitol and 2 ml of a bromothymol blue solution (BTB solution) were added to prepare a sample solution. To the sample solution, 0.1 mol/l sodium hydroxide was added dropwise until the point of neutralization was reached, and from its dropwise addition amount, a boric acid content (wt %) was calculated on the basis of the following expression.

{Dropwise addition amount of NaOH aqueous solution (mL)×Concentration of NaOH aqueous solution (mol/L)×$10^{-3}$/Weight of polarizer (g)}× Molecular weight of boric acid (g/mol)×100

(5) Iodine Content of Polarizer

The polarizer used in each of Examples and Comparative Examples was cut into a predetermined size to produce a sample for evaluation. For the produced sample for evaluation, an iodine concentration was quantified using a calibration curve method of X-ray fluorescence analysis. An apparatus used was an X-ray fluorescence analysis apparatus ZSX of Rigaku Corporation.

(6) Retardation Value and Birefringence Δn$_{xy}$ of Retardation Layer

A sample of 50 mm×50 mm was cut out of the retardation layer used in each of Examples and Comparative Examples, and was used as a measurement sample. For the produced measurement sample, an in-plane retardation was measured with a retardation measurement apparatus manufactured by Oji Scientific Instruments Co., Ltd. (product name: "KOBRA-WPR"). A measurement wavelength for the in-plane retardation was 550 nm, and a measurement temperature was 23° C. The resultant in-plane retardation value was divided by the thickness of the measurement sample to calculate a birefringence Δn$_{xy}$.

(7) Durability

A polarizing plate with a retardation layer obtained in each of Examples and Comparative Examples was cut into an A4 size. The retardation layer surface of the cut polarizing plate with a retardation layer was bonded onto a glass plate having a thickness of 0.7 μm through the intermediation of an acrylic pressure-sensitive adhesive (20 μm) to produce a measurement sample. The measurement sample was stored in a thermo-hygrostat oven at 60° C. and 90% RH for 240 hours, and then the look of the external appearance of the polarizing plate with a retardation layer was visually observed. Specifically, a look when the measurement sample was placed on a reflective plate having a reflectance of 80% or more under a state in which the glass plate faced downward was observed. Evaluation criteria are as described below.

Satisfactory: Streaky unevenness is not found.

Unsatisfactory: Streaky unevenness is visually recognized.

(8) Indentation Elastic Modulus of Adhesive Layer

Measurement was performed in conformity to JIS Z 2255. Specifically, the measurement was performed as described below. The produced polarizing plate with a retardation layer was cut to about 2 mm wide by about 5 mm long, and embedded in a resin. After that, the resultant was frozen under a freezing condition (from −30° C. to −100° C.), and in this state, cut with an ultramicrotome using a diamond knife so as to expose a cross-section, to thereby produce a sample for measurement. An indenter was set on the surface of the produced sample, and the indenter was pushed to a depth of 200 nm and pulled out to provide a load-displacement curve. An indentation elastic modulus (Er) was calculated from the resultant load (P)-displacement (h) curve through the use of the following equation. Measurement conditions were as described below.

$$Er = \frac{S}{2} \times \sqrt{\frac{\pi}{A}}$$

where $$S(\text{contact stiffness}) = \frac{dP}{dh}$$

$$A(\text{projected contact area}) = 3\sqrt{3}\, h_C^2 \tan^2 65 = 24.5 h_C^2$$

$$h_C = h_{max} - \varepsilon \frac{P_{max}}{S}$$

$$\varepsilon = 0.75$$

$P_{max}$: maximum load (Measurement Conditions)

Apparatus: "Triboindenter" manufactured by Hysitron Inc.

Indenter used: Berkovich made of diamond (triangular pyramid shape)

Measurement method: single indentation method

Measurement temperature: 25° C. (room temperature)

Reference Example 1: Production of Retardation Film Constituting Retardation Layer 1-1. Production of Polycarbonate Resin Film 26.2 Parts by mass of isosorbide (ISB), 100.5 parts by mass of 9,9-[4-(2-hydroxyethoxy)phenyl]fluorene (BHEPF), 10.7 parts by mass of 1,4-cyclohexanedimethanol (1,4-CHDM), 105.1 parts by mass of diphenylcarbonate (DPC), and 0.591 part by mass of cesium carbonate (0.2 mass % aqueous solution) serving as a catalyst were each loaded into a reaction vessel. Under a nitrogen atmosphere, as a first step of a reaction, the heating medium temperature of the reaction vessel was set to 150° C. and the raw materials were dissolved while being stirred as required (about 15 minutes).

Then, the pressure in the reaction vessel was changed from normal pressure to 13.3 kPa, and while the heating medium temperature of the reaction vessel was increased to 190° C. in 1 hour, generated phenol was taken out of the reaction vessel.

The temperature in the reaction vessel was kept at 190° C. for 15 minutes. After that, as a second step, the pressure in the reaction vessel was set to 6.67 kPa, the heating medium temperature of the reaction vessel was increased to 230° C. in 15 minutes, and generated phenol was taken out of the reaction vessel. As the stirring torque of the stirrer increased, the temperature was increased to 250° C. in 8 minutes, and in order to remove generated phenol, the pressure in the reaction vessel was reduced to 0.200 kPa or less. After the stirring torque reached a predetermined value, the reaction was terminated, and the produced reaction product was extruded into water and then pelletized to provide a polycarbonate resin having the following composition: BHEPF/ISB/1,4-CHDM=47.4 mol %/37.1 mol %/15.5 mol %.

The resultant polycarbonate resin had a glass transition temperature of 136.6° C. and a reduced viscosity of 0.395 dL/g.

The resultant polycarbonate resin was vacuum-dried at 80° C. for 5 hours, and then a polycarbonate resin film having a thickness of 120 μm was produced using a film-forming apparatus with a single-screw extruder (manufactured by Isuzu Kakoki, screw diameter: 25 mm, cylinder preset temperature: 220° C.), a T-die (width: 200 mm, preset temperature: 220° C.), a chill roll (preset temperature: 120° C. to 130° C.), and a take-up unit.

1-2. Production of Retardation Film

The resultant polycarbonate resin film was laterally stretched using a tenter stretching machine to provide a retardation film 1 having a thickness of 50 μm. In this case, the stretching ratio was 250%, and the stretching temperature was set to from 137° C. to 139° C.

The resultant retardation film had an Re (550) of from 137 nm to 147 nm and a birefringence Δn$_{xy}$ of from 0.0027 to 0.0029.

Reference Example 2: Production of Retardation Film Constituting Retardation Layer 2-1. Production of Polycarbonate Resin Film 445.1 Parts by weight of ISB, 906.2 parts by weight of BHEPF, 15.4 parts by weight of polyethylene glycol having a molecular weight of 1,000 (hereinafter sometimes abbreviated as "PEG#1000"), 1,120.4 parts by weight of DPC, and 6.27 parts by weight of cesium carbonate (0.2 wt % aqueous solution) serving as a catalyst were each loaded into a reaction vessel. Under a nitrogen atmosphere, as a first step of a reaction, the heating medium temperature of the reaction vessel was set to 150° C. and the raw materials were dissolved while being stirred as required (about 15 minutes).

Then, the pressure in the reaction vessel was changed from normal pressure to 13.3 kPa, and while the heating medium temperature of the reaction vessel was increased to 190° C. in 1 hour, generated phenol was taken out of the reaction vessel.

The temperature in the reaction vessel was kept at 190° C. for 15 minutes. After that, as a second step, the pressure in the reaction vessel was set to 6.67 kPa, the heating medium temperature of the reaction vessel was increased to 230° C. in 15 minutes, and generated phenol was taken out of the reaction vessel. As the stirring torque of the stirrer increased, the temperature was increased to 250° C. in 8 minutes, and in order to remove generated phenol, the pressure in the reaction vessel was reduced to 200 Pa or less. After the stirring torque reached a predetermined value, the reaction was terminated, and the produced reaction product was extruded into water and then pelletized to provide a polycarbonate resin having the following composition: BHEPF/ISB/PEG#1000=40.3 mol %/59.4 mol %/0.3 mol %.

The resultant polycarbonate resin was vacuum-dried at 80° C. for 5 hours, and then a polycarbonate resin film having a thickness of 60 μm was produced using a film-forming apparatus with a single-screw extruder (manufactured by Isuzu Kakoki, screw diameter: 25 mm, cylinder preset temperature: 220° C.), a T-die (width: 200 mm, preset temperature: 220° C.), a chill roll (preset temperature: 120° C. to 130° C.), and a take-up unit.

2-2. Production of Retardation Film

The resultant polycarbonate resin film was subjected to free-end uniaxial stretching at a ratio of 1×3.0 times with a batch-type biaxial stretching apparatus (manufactured by Toyo Seiki Seisaku-sho, Ltd.) at a stretching temperature of 148° C. to provide a retardation film 2 having a thickness of 35 μm.

The resultant retardation film had an Re (550) of from 135 nm to 145 nm and a birefringence $\Delta n_{xy}$ of from 0.0039 to 0.0041.

Reference Example 3: Production of Retardation Film Constituting Retardation Layer Polymerization was performed with a batch polymerization apparatus formed of two vertical reactors each including a stirring blade and a reflux condenser controlled to 100° C. 9,9-[4-(2-Hydroxyethoxy)phenyl]fluorene (BHEPF), isosorbide (ISB), diethylene glycol (DEG), diphenyl carbonate (DPC), and magnesium acetate tetrahydrate were loaded at a molar ratio of BHEPF/ISB/DEG/DPC/magnesium acetate=0.348/0.490/0.162/1.005/1.00×10$^{-5}$. The inside of a first reactor was sufficiently purged with nitrogen (oxygen concentration: 0.0005 vol % to 0.001 vol %), and then heated with a heating medium. When the internal temperature reached 100° C., stirring was started. The internal temperature was caused to reach 220° C. after 40 minutes from the start of the temperature increase, and while the temperature was controlled to be kept at this temperature, pressure reduction was simultaneously started, and the pressure was caused to reach 13.3 kPa in 90 minutes after the internal temperature had reached 220° C. A phenol vapor produced as a by-product along with the polymerization reaction was introduced into the reflux condenser at 100° C., a monomer component contained in a slight amount in the phenol vapor was returned to the first reactor, and a phenol vapor that did not condense was introduced into a condenser at 45° C. and recovered.

Nitrogen was introduced into the first reactor to temporarily return the pressure to the atmospheric pressure. After that, the oligomerized reaction liquid in the first reactor was transferred to a second reactor. Then, temperature increase and pressure reduction in the second reactor were started, and the internal temperature and the pressure were caused to reach 240° C. and 0.2 kPa, respectively in 50 minutes. After that, the polymerization was allowed to proceed until predetermined stirring power was achieved. When the predetermined power was achieved, nitrogen was introduced into the reactor to return the pressure to the atmospheric pressure, and the reaction liquid was extracted in the form of a strand and pelletized with a rotary cutter. Thus, a polycarbonate resin A having a copolymerization composition of BHEPF/ISB/DEG=34.8/49.0/16.2 [mol %] was obtained. The polycarbonate resin had a reduced viscosity of 0.430 dL/g and a glass transition temperature of 128° C.

The resultant polycarbonate resin was vacuum-dried at 80° C. for 5 hours, and then a polycarbonate resin film having a thickness of 130 μm was produced using a film-forming apparatus with a single-screw extruder (manufactured by Isuzu Kakoki, screw diameter: 25 mm, cylinder preset temperature: 220° C.), a T-die (width: 900 mm, preset temperature: 220° C.), a chill roll (preset temperature: 125° C.), and a take-up unit.

(Oblique Stretching)

Figure 6:
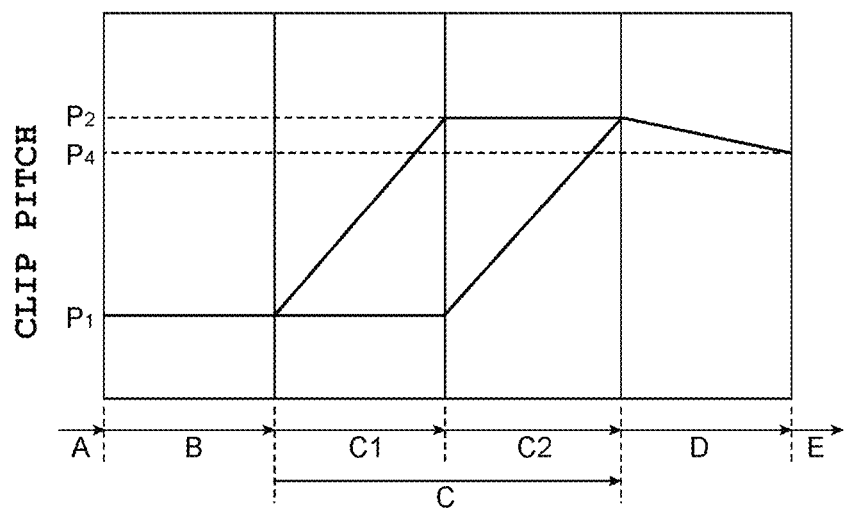
FIG. 6 is a graph for showing a relationship between each zone of the oblique stretching apparatus and the clip pitch during the oblique stretching illustrated in FIG. 5.

The polycarbonate resin film thus obtained was obliquely stretched by a method in conformity to Example 1 of JP 2014-194483 A to provide a retardation film. That is, through the use of an apparatus as illustrated in FIG. 2 to FIG. 5, in accordance with a clip pitch profile as shown in FIG. 6, the polycarbonate resin film was subjected to preheating treatment, oblique stretching, and MD shrinkage treatment to provide the retardation film. For a detailed configuration of the apparatus, the description of JP 2014-194483 A is incorporated herein by reference. A specific production procedure for the retardation film is as described below. The polycarbonate resin film (thickness: 130 μm, width: 765 mm) was preheated to 142° C. in a preheating zone of the stretching apparatus. In the preheating zone, clip pitches of left and right clips were 125 mm. Next, simultaneously with the entry of the film into a first oblique stretching zone C1, the increase of the clip pitch of the right clips was started, and the clip pitch was increased from 125 mm to 177.5 mm in the first oblique stretching zone C1. A clip pitch change ratio was 1.42. In the first oblique stretching zone C1, with regard to the clip pitch of the left clips, the reduction of the clip pitch was started, and the clip pitch was reduced from 125 mm to 90 mm in the first oblique stretching zone C1. A clip pitch change ratio was 0.72. Further, simultaneously with the entry of the film into a second oblique stretching zone C2, the increase of the clip pitch of the left clips was started, and the clip pitch was increased from 90 mm to 177.5 mm in the second oblique stretching zone C2. Meanwhile, the clip pitch of the right clips was kept at 177.5 mm in the second oblique stretching zone C2. In addition, simultaneously with the oblique stretching, stretching was also performed in a widthwise direction at a ratio of 1.9 times. The oblique stretching was performed at 135° C.

(MD Shrinkage Treatment)

Then, in a shrinkage zone, MD shrinkage treatment was performed. Specifically, the clip pitches of both the left clips and the right clips were reduced from 177.5 mm to 165 mm. A shrinkage ratio in the MD shrinkage treatment was 7.0%.

Thus, a retardation film 3 (thickness: 50 μm) was obtained. The resultant retardation film had an Re (550) of 141 nm and a birefringence $\Delta n_{xy}$ of 0.00282.

Example 1

1-1. Production of Polarizer

An amorphous polyethylene terephthalate (A-PET) film (manufactured by Mitsubishi Plastics, Inc., product name: NOVACLEAR SH046, thickness: 200 μm) was prepared as a substrate, and its surface was subjected to corona treatment (58 W/m²/min). Meanwhile, PVA (polymerization degree: 4,200, saponification degree: 99.2%) having added thereto 1 wt % of acetoacetyl-modified PVA (manufactured by the Nippon Synthetic Chemical Industry Co. Ltd., product name: Gohsefimer Z200, polymerization degree: 1,200, saponification degree: 99.0% or more, acetoacetyl modification degree: 4.6%) was prepared, and applied so as to have a film thickness after drying of 12 μm, followed by drying under a 60° C. atmosphere by hot-air drying for 10 minutes to produce a laminate in which a PVA-based resin layer was formed on the substrate. Then, the laminate was first stretched in air at 130° C. at a ratio of 2.0 times to provide a stretched laminate. Next, there was performed a step of insolubilizing the PVA-based resin layer containing aligned PVA molecules included in the stretched laminate by immersing the stretched laminate in an insolubilizing aqueous solution of boric acid having a liquid temperature of 30° C. for 30 seconds. In the insolubilizing aqueous solution of boric acid of this step, the boric acid content was set to 3 wt % with respect to 100 wt % of water. The resultant stretched laminate was dyed to produce a colored laminate. The colored laminate is a product obtained by immersing the stretched laminate in a dyeing liquid having a liquid temperature of 30° C. and containing iodine and potassium iodide, to thereby adsorb iodine onto the PVA-based resin layer included in the stretched laminate. An iodine concentration and an immersion time were adjusted so that the polarizer to be obtained had a single layer transmittance of 44.5%. Specifically, in the dyeing liquid, water was used as a solvent, the iodine concentration was set to fall within the range of from 0.08 wt % to 0.25 wt %, and the potassium iodide concentration was set to fall within the range of from 0.56 wt % to 1.75 wt %. A ratio between the concentrations of iodine and potassium iodide was 1 to 7. Next, there was performed a step of subjecting the PVA molecules of the PVA-based resin layer onto which iodine had been adsorbed to cross-linking treatment by immersing the colored laminate in a cross-linking aqueous solution of boric acid at 30° C. for 60 seconds. In the cross-linking aqueous solution of boric acid of this step, the boric acid content was set to 3 wt % with respect to 100 wt % of water, and the potassium iodide content was set to 3 wt % with respect to 100 wt % of water. Further, the resultant colored laminate was stretched in an aqueous solution of boric acid at a stretching temperature of 70° C. at a ratio of 2.7 times in the same direction as that of the stretching in the air, resulting in a final stretching ratio of 5.4 times. Thus, a laminate of "substrate/polarizer" was obtained. In the cross-linking aqueous solution of boric acid of this step, the boric acid content was set to 6.5 wt % with respect to 100 wt % of water, and the potassium iodide content was set to 5 wt % with respect to 100 wt % of water. The resultant laminate was removed from the aqueous solution of boric acid, and boric acid adhering to the surface of the polarizer was washed off with an aqueous solution having a potassium iodide content of 2 wt % with respect to 100 wt % of water. The washed laminate was dried with warm air at 60° C.

1-2. Production of Polarizing Plate with a Retardation Layer

Onto the polarizer surface of the laminate of "substrate/polarizer" obtained in the foregoing, the retardation film 1 obtained in Reference Example 1 was bonded through the intermediation of a PVA-based adhesive (indentation elastic modulus: 4.0 GPa). In this case, the bonding was performed so that the absorption axis of the polarizer and the slow axis of the retardation layer (retardation film) formed an angle of 450. Further, the A-PET film serving as the substrate was peeled from the laminate, and an acrylic film having a thickness of 40 μm was bonded onto the peeled surface through the intermediation of a PVA-based adhesive (indentation elastic modulus: 4.0 GPa). Thus, a polarizing plate 1 with a retardation layer having a configuration of "protective layer/first adhesive layer/polarizer/second adhesive layer/retardation layer" was obtained. In this case, the thickness of each of the first adhesive layer and the second adhesive layer was set to 1 μm. The resultant polarizing plate 1 with a retardation layer was subjected to the durability evaluation described above. The result is shown in Table 1.

Example 2

2-1. Production of Polarizer

An elongate roll of a polyvinyl alcohol (PVA)-based resin film having a thickness of 30 μm (manufactured by Kuraray Co., Ltd., product name: "PE3000") was uniaxially stretched in an elongate direction with a roll stretching machine at a ratio of 5.9 times in the elongate direction, and at the same time, was subjected to swelling, dyeing, cross-linking, and washing treatments, followed finally by drying treatment. Thus, a polarizer having a thickness of 12 μm was produced.

Specifically, in the swelling treatment, the film was stretched at a ratio of 2.2 times while being treated with pure water at 20° C. Then, in the dyeing treatment, the film was stretched at a ratio of 1.4 times while being treated in an aqueous solution at 30° C. containing iodine and potassium iodide at a weight ratio of 1:7, whose iodine concentration had been adjusted so that the polarizer to be obtained had a single layer transmittance of 45.0%. Further, two-stage cross-linking treatment was adopted for the cross-linking treatment. In the first-stage cross-linking treatment, the film was stretched at a ratio of 1.2 times while being treated in an aqueous solution at 40° C. having dissolved therein boric acid and potassium iodide. The boric acid content and potassium iodide content of the aqueous solution of the first-stage cross-linking treatment were set to 5.0 wt % and 3.0 wt %, respectively. In the second-stage cross-linking treatment, the film was stretched at a ratio of 1.6 times while being treated in an aqueous solution at 65° C. having dissolved therein boric acid and potassium iodide. The boric acid content and potassium iodide content of the aqueous solution of the second-stage cross-linking treatment were set to 4.3 wt % and 5.0 wt %, respectively. In addition, in the washing treatment, the film was treated in an aqueous solution of potassium iodide at 20° C. The potassium iodide content of the aqueous solution of the washing treatment was set to 2.6 wt %. Finally, the film was dried at a drying treatment of 70° C. for 5 minutes. Thus, the polarizer was obtained.

2-2. Production of Polarizing Plate with a Retardation Layer

Onto both surfaces of the resultant polarizer, through the intermediation of a PVA-based adhesive (indentation elastic modulus: 4.0 GPa), the retardation film 2 obtained in Reference Example 2 and a HC-TAC film (thickness: 32 μm) were bonded, respectively. Thus, a polarizing plate 2 with a retardation layer having a configuration of "protective layer/first adhesive layer/polarizer/second adhesive layer/retardation layer" was obtained. In this case, the thickness of each of the first adhesive layer and the second adhesive layer was set to 2 μm. In addition, the bonding was performed so that the absorption axis of the polarizer and the slow axis of the retardation layer (retardation film) formed an angle of 45°. The HC-TAC film was produced by forming a hard coat (HC) layer on one surface of a TAC film manufactured by Konica Minolta, Inc. (product name: KC2UA, thickness: 25 μm) through hard coat treatment. The resultant polarizing plate 2 with a retardation layer was subjected to the durability evaluation described above. The result is shown in Table 1.

Example 3

A polarizing plate 3 with a retardation layer having a configuration of "protective layer/first adhesive layer/polarizer/second adhesive layer/retardation layer" was obtained in the same manner as in Example 1 except that: the retardation film 3 was used instead of the retardation film 1; and the retardation film 3 was bonded onto the polarizer surface of the laminate of "substrate/polarizer" by a so-called roll-to-roll process. The resultant polarizing plate 3 with a retardation layer was subjected to the durability evaluation described above. The result is shown in Table 1.

Comparative Example 1

Figure 7:
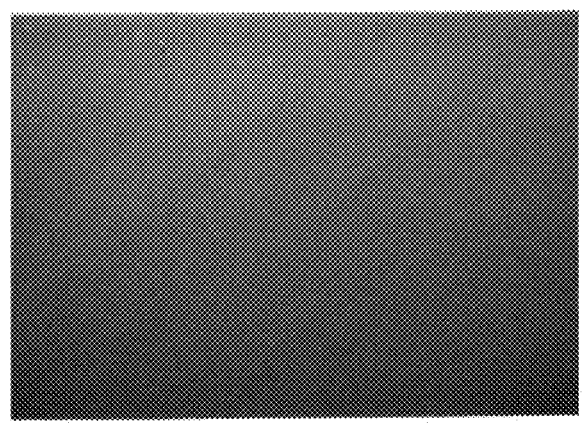
FIG. 7 is a photographic image for showing the external appearance of a polarizing plate with a retardation layer of Comparative Example 1 after a durability test.

A polarizing plate 4 with a retardation layer having a configuration of "protective layer/first adhesive layer/polarizer/second adhesive layer/retardation layer" was obtained in the same manner as in Example 1 except that the boric acid content of the cross-linking aqueous solution of boric acid in the stretching step in the aqueous solution of boric acid was changed from 6.5 wt % to 3 wt % with respect to 100 wt % of water. The resultant polarizing plate 4 with a retardation layer was subjected to the durability evaluation described above. The result is shown in Table 1. Further, a photographic image for showing an external appearance after the durability test is shown in FIG. 7.

Comparative Example 2

A polarizing plate 5 with a retardation layer having a configuration of "protective layer/first adhesive layer/polarizer/second adhesive layer/retardation layer" was obtained in the same manner as in Example 1 except that the thickness of each of the first adhesive layer and the second adhesive layer was set to 20 μm. The resultant polarizing plate 5 with a retardation layer was subjected to the durability evaluation described above. The result is shown in Table 1.

TABLE 1

| | | Example 1 | Example 2 | Example 3 | Comparative Example 1 | Comparative Example 2 |
|---|---|---|---|---|---|---|
| Polarizer | Thickness (μm) | 5 | 12 | 5 | 5 | 5 |
| | Boric acid content (wt %) | 25 | 18 | 25 | 17 | 25 |
| | Iodine content (wt %) | 5.3 | 2.1 | 5.3 | 5.8 | 5.3 |
| | Single layer transmittance (%) | 44.5 | 45.0 | 44.5 | 44.5 | 44.5 |
| | Polarization degree (%) | 98.5 | 99 | 98.5 | 98.5 | 98.5 |
| | Orientation function | 0.36 | 0.49 | 0.36 | 0.28 | 0.36 |
| Retardation layer | Thickness (μm) | 50 | 35 | 50 | 50 | 50 |
| | Birefringence | 0.0028 | 0.0040 | 0.0028 | 0.0028 | 0.0028 |
| Adhesive layer | Thickness of first adhesive layer (μm) | 1 | 2 | 1 | 1 | 20 |
| | Thickness of second adhesive layer (μm) | 1 | 2 | 1 | 1 | 20 |
| Evaluation | Durability | Satisfactory | Satisfactory | Satisfactory | Unsatisfactory | Unsatisfactory |

<Evaluation>

As apparent from Table 1, the polarizing plate with a retardation layer of each of Examples of the present invention had satisfactory durability, and the polarizing plate with a retardation layer of each of Comparative Examples had unsatisfactory durability. That is, it is found that according to the present invention, through the optimization of predetermined conditions of the polarizer, the retardation layer, and the adhesive layers constituting the polarizing plate with a retardation layer, the durability can be remarkably improved in the extremely thin polarizing plate with a retardation layer.

INDUSTRIAL APPLICABILITY

The polarizing plate with a retardation layer of the present invention is suitably used in an image display apparatus, such as a liquid crystal display apparatus or an organic EL display apparatus.

REFERENCE SIGNS LIST 11 polarizer
12 protective layer
20 retardation layer
31 first adhesive layer
32 second adhesive layer
100 polarizing plate with a retardation layer

The invention claimed is:
1. A polarizing plate with a retardation layer, comprising:
a polarizer;

a protective layer bonded onto one side of the polarizer through intermediation of a first adhesive layer; and a retardation layer bonded onto another side of the polarizer through intermediation of a second adhesive layer, wherein the polarizer has a thickness of from 2 μm to 12 μm, a boric acid content of 18 wt % or more, an iodine content of 2.1 wt % or more, a single layer transmittance of 44.2% or more, a polarization degree of 98% or more, and an orientation function of 0.35 or more, wherein the retardation layer has a thickness of 50 μm or less and a birefringence $\Delta n_{xy}$ of 0.0025 or more, and wherein the first adhesive layer and the second adhesive layer each have a thickness of 2 μm or less.

2. The polarizing plate with a retardation layer according to claim 1, wherein the retardation layer comprises a resin film selected from a cyclic olefin-based resin film and a polycarbonate-based resin film.

3. The polarizing plate with a retardation layer according to claim 1, wherein the retardation layer is configured to function as a λ/4 plate.

4. The polarizing plate with a retardation layer according to claim 1, wherein the polarizer is obtained by forming a polyvinyl alcohol-based resin layer on one side of a resin substrate, and stretching and dyeing a laminate of the resin substrate and the polyvinyl alcohol-based resin layer to turn the polyvinyl alcohol-based resin layer into a polarizer.

5. The polarizing plate with a retardation layer according to claim 1, wherein the polarizing plate with a retardation layer has a total thickness of 150 μm or less.

6. The polarizing plate with a retardation layer according to claim 1, wherein the first adhesive layer and the second adhesive layer each have an indentation elastic modulus of $1.0 \times 10^7$ Pa or more.

7. An image display apparatus, comprising the polarizing plate with a retardation layer of claim 1.

* * * * *